United States Patent
Yamauchi et al.

(10) Patent No.: US 6,388,881 B2
(45) Date of Patent: May 14, 2002

(54) VEHICLE CENTER CLUSTER ASSEMBLING STRUCTURE WITH ELECTRICAL CONNECTION

(75) Inventors: Shouji Yamauchi, Iwakura; Noritoshi Imanaka; Kenichi Mori, both of Nagoya; Katsuharu Yokoyama, Kobe, all of (JP); Masahiro Ichino, Carmel, IN (US); Kenji Nakata, Nishinomiya (JP)

(73) Assignees: Denso Corporation, Kariya; Fujitsu Ten Limited, Kobe, both of (JP)

( * ) Notice: Subject to any disclaimer, the term of this patent is extended or adjusted under 35 U.S.C. 154(b) by 0 days.

(21) Appl. No.: 09/779,949

(22) Filed: Feb. 9, 2001

(30) Foreign Application Priority Data

| Feb. 9, 2000 | (JP) | 2000-038117 |
| Feb. 10, 2000 | (JP) | 2000-038219 |
| Feb. 25, 2000 | (JP) | 2000-054422 |

(51) Int. Cl.$^7$ ................................................. H05K 7/20
(52) U.S. Cl. .................. 361/704; 361/627; 361/632; 361/633; 361/636; 361/643; 361/647; 296/70; 296/72; 307/9.1; 307/10.1; 174/71 R; 174/72 A; 180/90
(58) Field of Search ............... 361/688, 622, 361/627–636, 704, 707, 720, 721, 641–647; 296/70, 72; 307/10.1, 9.1; 174/71 R

(56) References Cited

U.S. PATENT DOCUMENTS

| 4,750,265 A | * | 6/1988 | Watanabe et al. ............. 29/854 |
| 4,929,182 A | * | 5/1990 | Hyogo et al. .................. 439/34 |
| 4,942,499 A | * | 7/1990 | Shibata et al. ............... 361/826 |
| 5,324,203 A | * | 6/1994 | Sano et al. .................... 439/34 |
| 5,353,190 A | * | 10/1994 | Nakayama et al. ......... 361/647 |
| 5,442,518 A | * | 8/1995 | Beam .......................... 361/690 |
| 5,549,344 A | * | 8/1996 | Nishijima et al. ............. 296/70 |
| 5,663,866 A | * | 9/1997 | Ichikawa et al. ........... 361/643 |
| 5,768,092 A | * | 6/1998 | Nishitani ..................... 361/627 |
| 5,841,070 A | * | 11/1998 | Takiguchi et al. ........ 174/72 A |
| 5,883,777 A | * | 3/1999 | Nishitani et al. ............ 361/647 |
| 6,048,020 A | * | 4/2000 | Gronowicz et al. ........... 296/70 |
| 6,250,706 B1 | * | 6/2001 | Davis, Jr. et al. ............. 296/70 |

FOREIGN PATENT DOCUMENTS

| JP | 402024238 A | * | 1/1990 | ................. 280/752 |

* cited by examiner

*Primary Examiner*—Leo P. Picard
*Assistant Examiner*—Boris L. Chervinsky
(74) *Attorney, Agent, or Firm*—Harness, Dickey & Pierce, PLC

(57) ABSTRACT

In an assembling structure of a vehicle center cluster, plural electrical devices are detachably assembled to a holding member to be removed from an inside of a passenger compartment while the holding member is fixed to a dashboard. Therefore, for example, when a CD deck is removed from the center cluster into the passenger compartment among the electrical devices, only the CD deck can be removed from the holding member into the passenger compartment without removing the other electrical devices, in a fixed state of the holding member to the dashboard. Accordingly, removing operation of the electrical devices can be made simple.

24 Claims, 11 Drawing Sheets

VEHICLE CENTER CLUSTER ASSEMBLING STRUCTURE WITH ELECTRICAL CONNECTION

CROSS-REFERENCE TO RELATED APPLICATION

This application is related to and claims priority from Japanese Patent Applications No. 2000-38117 filed on Feb. 9, 2000, No. 2000-38219 filed on Feb. 10, 2000, and No. 2000-54422 filed on Feb. 25, 2000, the contents of which are hereby incorporated by reference.

BACKGROUND OF THE INVENTION

1. Field of the Invention

The present invention relates to a center cluster assembling structure in which a plurality of electrical devices disposed nearly centrally in a transverse direction of a vehicular instrument panel, such as an audio unit, a display unit, a navigation unit, and an air-conditioning operating unit, are clustered as an integral structure. In addition, the present invention relates to an electrical connection structure of the electrical devices.

2. Description of Related Art

As shown in FIGS. 11A, 11B, a center cluster 101 is constructed by an audio unit 140 and an air-conditioning operating unit 180 which are disposed centrally in a transverse direction (width direction) of a vehicular instrument panel.

In the audio unit 140, switch portions (not shown) of operating members 140S for operating the audio unit 140, a CD deck 142, and a main electrical circuit substrate 161 are fixed within a case 107 by clamping means such as screws. Brackets 108 mounted sideways of the case 107 are clamped respectively to instrument panel-side mounting members 109 by bolts 108a to hold the audio unit 140 in the vehicular instrument panel.

The case 107 includes a case body 107a which is formed into a box shape using a sheet metal, an ornamental panel 107b made of resin and covering an opening of the case body 107a, opened toward an inside of a passenger compartment, and a heat radiating fin 107c which contacts a power IC 161a formed on the main electrical circuit substrate 161 and which functions to radiate heat from the power IC 161a. The operating members 140S having the switch portions are disposed so as to be exposed directly into the passenger compartment from apertures formed in the ornament panel 107b. The ornamental panel 107b and the heat radiating fin 107c are fastened to the case body 107a using screws 107d from both side and rear portions of the case body 107a.

Also, in the air-conditioning operating unit 180, similarly to the audio unit 140, a case 107 which incorporates therein switch portions (not shown) of operating members 180S and a main substrate (not shown) is clamped to the instrument panel-side mounting members 109 through brackets 108. One or more connectors 106a of one or more vehicle-side wire harnesses 106 on the vehicle front side are connected to center cluster 101.

A frame-shaped front panel 110 is fitted on outer edges of the cases 107 of the audio unit 140 and the air-conditioning operating unit 180 from the inside of the passenger compartment so that the brackets 108 and the like are hidden from the interior of the passenger compartment.

However, in a case where the CD deck 142 or the substrate 161 are to be taken out from the center cluster 101 into the passenger compartment, when an attempt is made to remove the ornamental panel 107b from the case body 107a, the air-conditioning operating unit 180 is an obstacle to removal of the ornamental panel 107b because it is disposed just above the screws 107d.

Therefore, in a state where the case body 107a is fixed to the instrument panel, it is impossible to remove the CD deck 142 and the main electrical circuit substrate 161 from the inside of the passenger compartment. Unless the case 107 is once taken out into the passenger compartment and is disassembled, it is impossible to take out the CD deck 142 and the main electrical circuit substrate 161 from the interior of the case 107 into the passenger compartment.

More particularly, for taking out the CD deck 142 and the main electrical circuit substrate 161 from the center cluster 101 into the passenger compartment, first the ornamental panel 110 is removed and the case 107 is removed from the instrument panel-side mounting members 109, then the ornamental panel 107b or the heat radiating fin 107c is removed from the case body 108a, and thereafter the CD deck 142 and the main electrical circuit substrate 161 are removed from the case body 107a.

Thus, even when only the CD deck 142 or the main substrate 161 is to be taken out into the passenger compartment, it is required to once take out the whole of the audio unit 140 into the passenger compartment. Such a manual work for removing the whole of the audio unit 140 which is heavy has been a heavy labor. Besides, an additional work is needed for disassembling the case 107 into the case body 107a, the ornamental panel 107b and the heat radiating fin 107c. Thus, the operation for removing the CD deck 142 and the substrate 161 is made to be complicated.

SUMMARY OF THE INVENTION

In view of the foregoing problems, it is an object of the present invention to provide a center cluster assembling structure which facilitates operation for removing such electrical devices of a vehicular center cluster as a CD deck and a main electrical circuit substrate.

It is an another object of the present invention to provide an electrical connection structure of plural electrical devices of a vehicle center cluster, which improves electrical connection operation and electrical removing operation between the electrical devices and a wire harness.

According to the present invention, in an assembling structure of a center cluster disposed inside a dashboard of a vehicle at an approximate center portion in a vehicle right-left direction, electrical devices are assembled to a holding member to be respectively detachable from an inside of a passenger compartment of the vehicle while the holding member is fixed to the dashboard. Therefore, when one of the electrical devices (e.g., a deck) is removed from the center cluster, only the one of the electrical devices can be detached from the holding member without detaching the other electrical devices, in a state where the holding member is fixed to the dashboard. Further, when the center cluster is assembled to the vehicle, first, the holding member is fixed to the dashboard from the inside of the passenger compartment, and then the electrical devices are respectively assembled to the holding member from the inside of the passenger compartment. As a result, any one of the electrical devices can be readily removed from the passenger compartment, and removing operation of the electrical device can be made simple.

Preferably, the electrical deck and the electrical circuit substrate are disposed to be stacked in a vertical direction.

Therefore, the electrical deck and the electrical circuit substrate can be readily removed from the passenger compartment, among the electrical devices.

More preferably, the electrical devices have front side surfaces opposite to the inside of the passenger compartment in a vehicle front-rear direction, the front side surfaces of the electrical devices have engagement portions, respectively, being detachably engaged with engagement portions of the holding member, and at least one of the engagement portions of the electrical devices and the engagements of the holding member is elastically deformed while being engaged. Therefore, the electrical devices and the holding member can be fitted by an elastic deformation. Accordingly, the electrical devices can be readily detachably assembled to the holding member fixed to the dashboard.

On the other hand, in an electrical connection structure of the vehicle center cluster, a wire harness for supplying electrical power to the electrical devices is electrically connected to one electrical device through a connection portion disposed at a vehicle rear side position of the one electrical device, and an ornamental panel is disposed at a vehicle rear side of the connection portion and the electrical devices and is assembled to be detachable from the inside of the passenger compartment. Accordingly, the electrical devices, the wire harness and the connection portion can be covered by the ornamental panel to be prevented from being exposed into the passenger compartment. Further, because the connection portion is disposed at the vehicle rear side of the one electrical device, the wire harness can be readily connected to or removed from the electrical device from the passenger compartment when the ornamental panel is removed from the passenger compartment. As a result, electrical connection operation and electrical removing operation between the wire harness and the electrical device can be readily accurately performed.

Further, an operating circuit substrate having an operating member is provided at a vehicle rear side of the electrical devices to operate the electrical devices from the inside of the passenger compartment, the electrical devices are electrically connected to the operating circuit substrate, and the electrical devices are electrically connected from each other through a printed circuit on the operating circuit substrate. Therefore, the electrical connection structure of the electrical devices of the center cluster can be made simple. Accordingly, assembling operation of the center cluster on the vehicle and removing operation of the center cluster from the vehicle can be made easy, with the simple electrical connection of the electrical devices.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

Preferred embodiments of the present invention will be described hereinafter with reference to the accompanying drawings.

Figure 2:
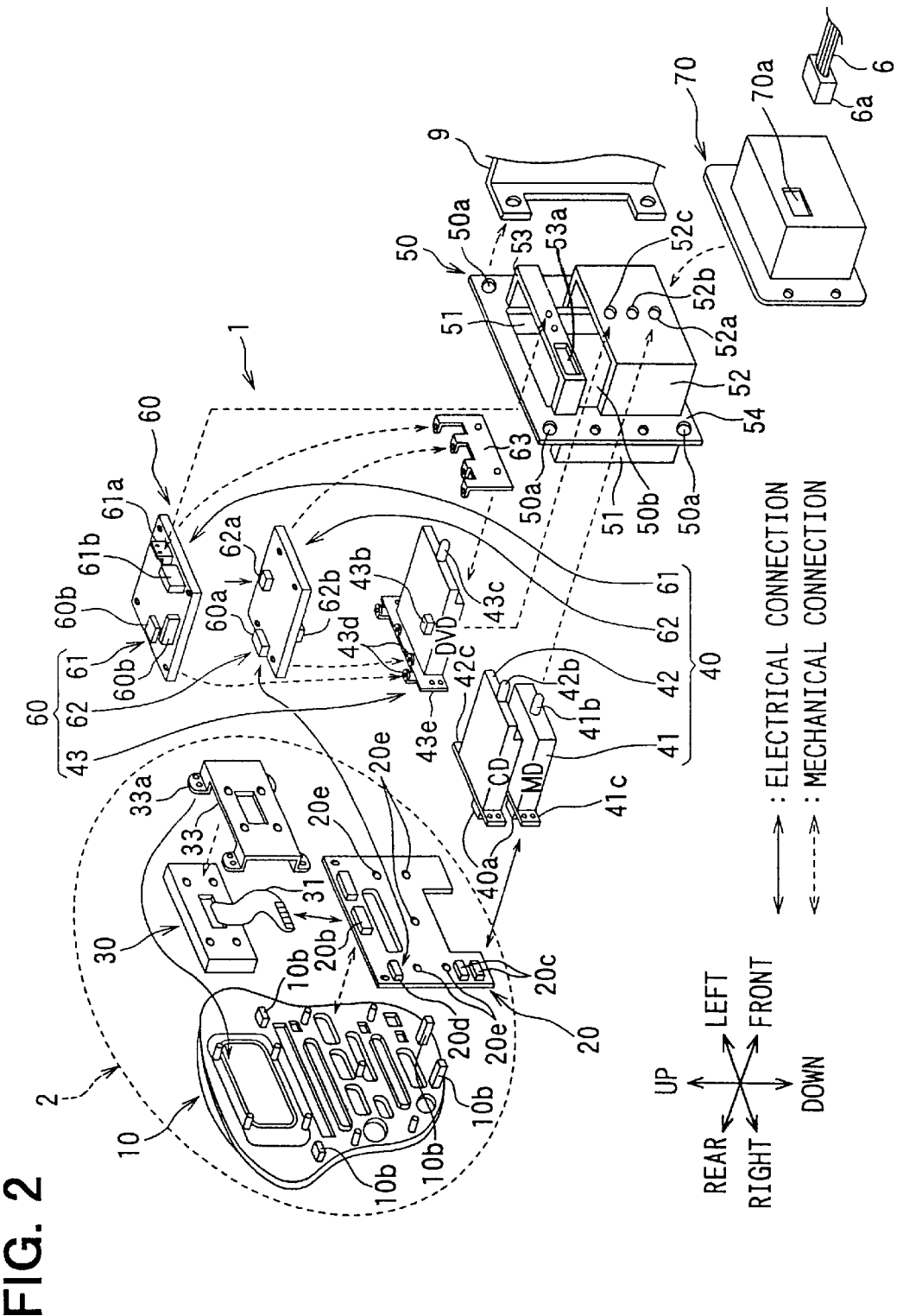
FIG. 2 is an exploded perspective view of the center cluster when being viewed from a vehicle front side, according to the first embodiment.
Figure 3:
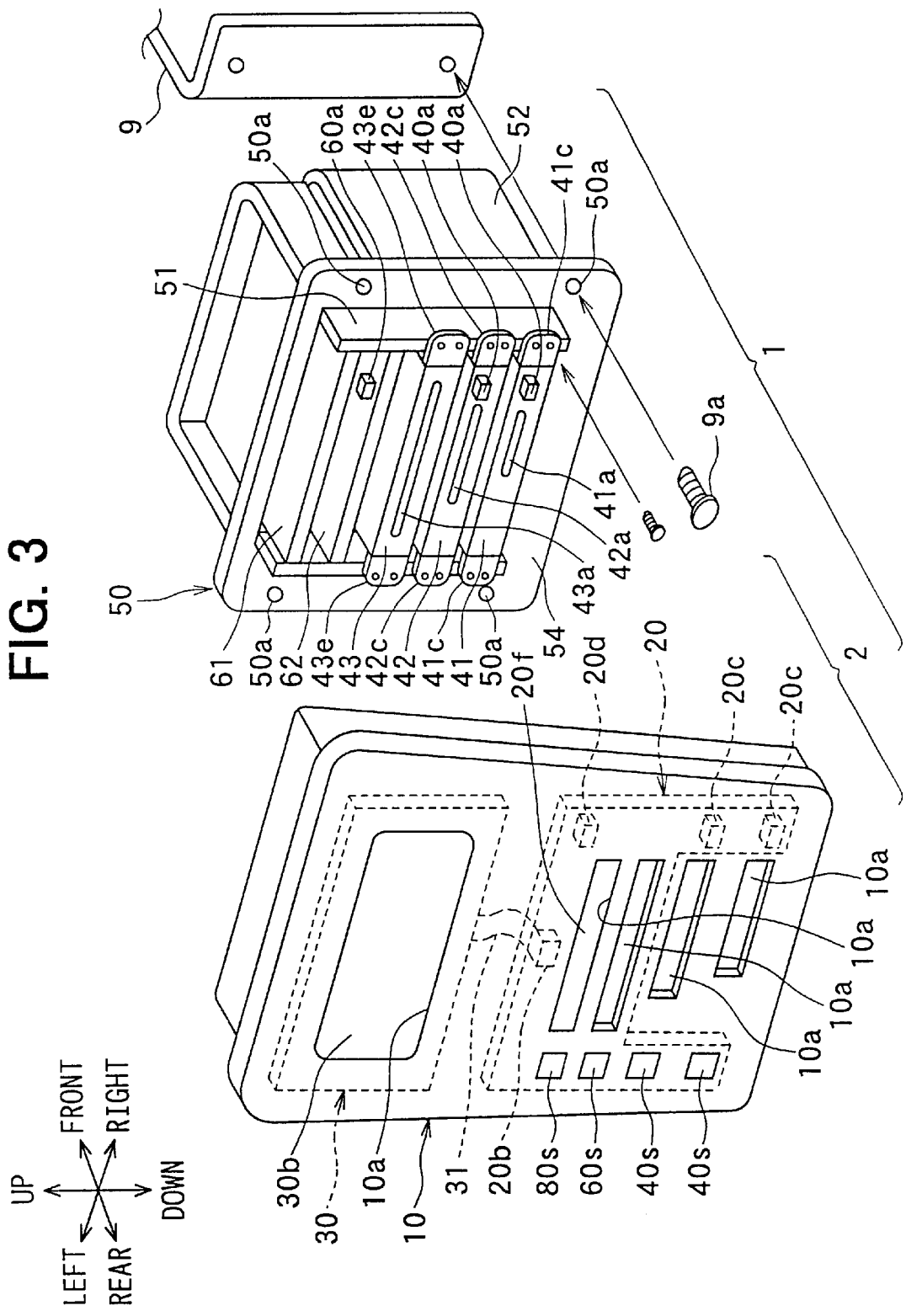
FIG. 3 is an exploded perspective view of the center cluster when being viewed from a vehicle rear side, according to the first embodiment.

A first preferred embodiment of the present invention will be now described with reference to FIGS. 1–3.

Figure 1:
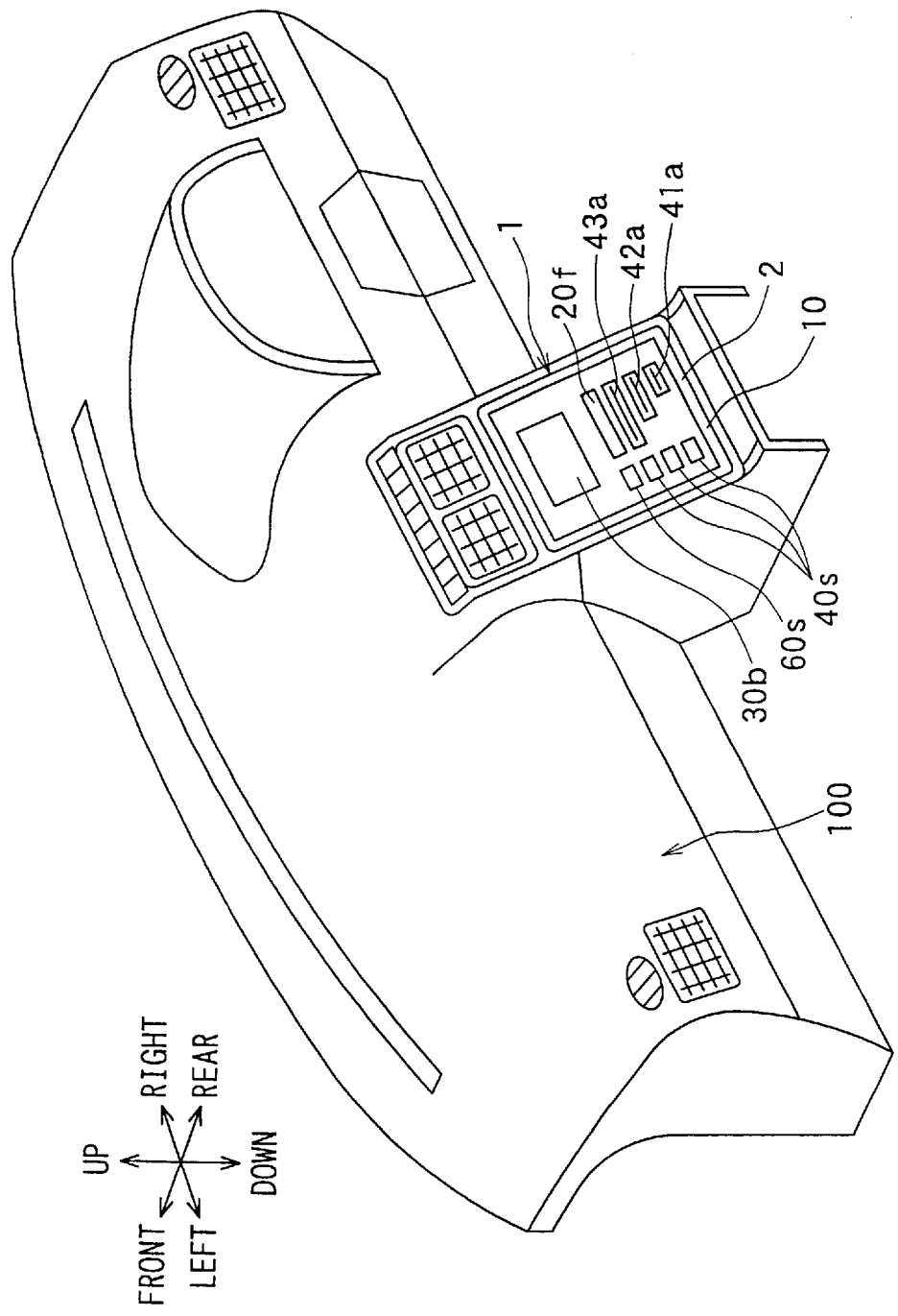
FIG. 1 is a perspective view showing a center cluster when being viewed from a vehicle rear side, according to a first preferred embodiment of the present invention.

FIG. 1 is a perspective view of a center cluster 1 when being viewed from an inside of a vehicular passenger compartment (i.e., from a rear side of a vehicle). In the center cluster 1, a plurality of electrical devices, including a display unit 30, an audio unit 40 and a navigation unit 60, which will be described later, are clustered as an integral structure. The center cluster 1 is disposed centrally in a width direction of an instrument panel 100. FIG. 2 is an exploded perspective view of the center cluster 1 as seen from a front side of the vehicle, and FIG. 3 is an exploded perspective of the center cluster 1 as seen from a rear side of the vehicle. In the center cluster 1, an ornamental panel (front panel) 10, an operating circuit substrate 20, and the display unit 30 are assembled as an integral structure and constitute a panel cluster 2.

First, the panel cluster 2 will be now described. The ornamental panel 10 is a resinous panel which covers the electrical devices 30, 40 and 60 from the inside of the passenger compartment (rear side of the vehicle). The ornamental panel 10 is provided with plural apertures 10a for insertion therein of operating members 40S, 60S and 80S for operating the electrical devices 30, 40 and 60, and a liquid display portion 30b of the display unit 30. In the first embodiment, an operation member for operating the liquid display portion 30b is not indicated.

On a vehicular front side of the ornamental panel 10, ornamental panel mounting lugs 10b are formed at four positions. The mounting lugs 10b projects to the vehicular front side, and can be vertically deformed elastically. The ornamental mounting lugs 10b, while being vertically deformed elastically, come into engagement with a holding member 50 to be described later to fasten the panel cluster 2 to the holding member 50. In this case, the object to be engaged with the panel cluster 2 is not limited to the holding member 50, but may be the instrument panel 100.

The operating circuit substrate 20 is disposed at a vehicular front side of the ornamental panel 10 in parallel with the ornamental panel 10, and is provided with various electronic components (not shown). On both side surfaces of the operating circuit substrate 20, printed circuits (not shown) of conductor patterns are formed. Through the printed circuits, the electrical devices 30, 40 and 60 are electrically connected from each other on the operating circuit substrate 20.

On the vehicular rear side of the operating circuit substrate 20, operating members 40S, 60S and 80S such as operating buttons, levers, or switches, which are connected to the printed circuits, are provided. The operating members 40S, 60S and 80S are operated by the driver or a front passenger in the passenger compartment to operate the display unit 30, the audio unit 40 and the navigation unit 60 to be described later. The operation member for operating the display unit 30 is not indicated in FIGS. 1–3. The operating members 80S is of an air-conditioning operating unit (not shown) which controls an air-conditioning operation (not shown) electronically.

On the vehicular rear side of the operating circuit substrate 20, a display member 20f (e.g., an electroluminescent display or a liquid crystal display), for displaying an operating condition of an air conditioner, is provided.

On the vehicular front side of the operating circuit substrate 20, operating circuit substrate-side connectors 20b, 20c and 20d for electrical connection with the electrical devices 30, 40 and 60 are provided. The connectors 20b, 20c and 20d are connected to the printed circuits. Thus, the operating circuit substrate-side connectors 20b, 20c and 20d are electrically connected with each other to permit the transfer of signals.

Tapping screws (not shown) are inserted into fastening holes 20e formed in the operating circuit substrate 20 to fasten the substrate 20 to the ornamental panel 10, and the operating members 40S, 60S, 80S and the EL display 20f are inserted into the apertures 10a of the ornamental panel 10 to be exposed directly to the inside of the passenger compartment.

The display unit 30 is for displaying various images, e.g., navigation maps and televisional images, to the vehicle driver or other passengers if any. The liquid crystal display portion 30b of the display unit 30 is exposed directly to the interior of the passenger compartment from the associated aperture 10a. The vehicular front side of the display unit 30 is provided with a flexible cable 31 for communication of image data, etc. The flexible cable 31 is connected to the connector 20b of the operating circuit substrate 20 to effect intercommunication of image data, and the like, between the display unit 30 and the operating circuit substrate 20.

A display holding member 33 is formed into a plate like, and is disposed on the vehicular front side of the display unit 30. The display holding member 33 is fixed to the display unit 30 using clamping means such as screws. An outer edge of the display holding member 33 is provided with four mounting pieces 33a extending toward the ornamental panel 10. By fastening the mounting pieces 33a to the ornamental panel 10 with clamping means such as tapping screws, the display unit 30 is held in the ornamental panel 10.

Thus, the panel cluster 2 is constructed by mounting the operating circuit substrate 20 and the display unit 30 to the ornamental panel 10.

The holding member 50 is disposed on a vehicular front side of the panel cluster 2 for holding the whole of the center cluster 1 in the instrument panel 100. The holding member 50 is formed by a rectangular plate in a shape of a frame having a central rectangular opening 50b. The holding member 50 is made of a light metal (e.g., magnesium alloy). A suitable light metal is one having a thermal conductivity higher than that of a first integrated substrate 61 to be described later and having an earthing property and an electromagnetic shielding property for the first and second integrated substrates 61, 62.

The holding member 50 is disposed so that its plate surface 54 comprises a fitting portion which is perpendicular to the vehicular front-rear direction and bolts 9a are inserted into bolt inserting holes (mounting portions) 50a formed in the four corners of the holding member 50 to fasten the holding member 50 to instrument panel-side mounting brackets 9.

Decks (electrical device components) 41–43 as well as the first and second integrated substrates (electrical device components) 61, 62, are inserted into the opening 50b of the holding member 50 in a vertically stacked fashion from the vehicular rear side (i.e., from the inside of the passenger compartment). On both side edges in the vehicular width direction (right-left direction) of the opening 50b, guide portions 51 extending toward the vehicular rear side are provided to guide both right and left side surfaces of the decks 41–43 into the opening 50b.

Likewise, on both side edges in the vehicular width direction of the opening 50b, a stopper portion 52 is formed into a U-shape to extend toward the vehicular front side and to contact vehicular front sides of the decks 41–43. Further, a frame or connecting portion 53 is formed into a U-shape to extend toward the vehicular front side and to be connected mechanically with the first integrated substrate 61. Centrally in the vehicular width direction of the stopper 52, insertion holes (holding member-side fitting portions) 52a, 52b, 52c into which projections 41b, 42b and 43c of the decks 41–43 are inserted are provided. Projections 41b, 42b and 43 c are located on the front side surfaces of the decks 41–43 opposite to the inside of the passenger compartment.

The audio unit 40 is disposed on a vehicular front side of the operating circuit substrate 20. The audio unit 40 includes a MD deck 41 for reading an audio signal from an MD (mini disc), a CD deck 42 for reading an audio signal from a CD (compact disc), the first and second integrated substrates 61, 62 which control the audio unit 40 electronically through an ECU 60b, and the operating members 40S. The first and second integrated substrates 61, 62 also function to control the navigation unit 60 electronically and further control the electrical devices 30, 40 and 60 synthetically. Further details will be described later.

The MD deck 41, the CD deck 42, and the first and second integrated substrates 61, 62 are stacked vertically. On the vehicular rear sides of the decks 41 and 42, disc inserting slots 41a and 42a are formed so as to be exposed directly to the interior of the passenger compartment from the associated apertures 10a formed in the ornamental panel 10.

Deck-side connectors (components-side connectors) 40a having the same shape are provided respectively in the MD deck 41 and the CD deck 42 opposite to the operating circuit substrate 20. The connectors 40a are inserted in the vehicular front-rear direction into the substrate-side connectors 20c of the substrate 20 and are thus connected directly without the use of wiring.

On the vehicular front-side surfaces of the decks 41 and 42 at a center portion in the vehicular right-left direction, projections 41b and 42b projecting to the vehicular front side are formed respectively. On the vehicular rear-side surfaces of the decks 41 and 42 toward the inside of the passener compartment, deck mounting portions (fastening means) 41c and 42c projecting in the vehicular right-left direction are formed. The deck mounting portions 41c and 42c come into abutment against the vehicular rear-side surfaces of the guide portion 51 of the holding member 50 to attach the decks 41 and 42 to the holding member 50.

The navigation unit 60 includes the first and second integrated substrates 61, 62 described above, a DVD deck 43 for reading signals such as map data signals for navigation from a DVD (digital video disc), and the operating members 60S 20 described above. The second integrated substrate 62, the first integrated substrate 61, and the DVD deck 43 are stacked successively above the CD deck 42.

On the vehicular rear-side surface of the DVD deck 43, connecting portions 43d extending upward for connection with the first and second integrated substrates 61, 62, respectively, are formed. On the vehicular front side of both substrates 61 and 62, a connecting member 63 is disposed. Both the substrates 61 and 62 and the DVD deck 43 are connected together mechanically through the connecting member 63 and the connecting portions 43d of the DVD deck 43 by fastening means such as screws.

The first and second integrated substrates 61, 62 are connected together electrically by a first integrated substrate-side connector (not shown) and a second integrated substrate-side connector 62a which are provided on the sides opposed to each other of the substrates 61, 62. The second integrated substrate 62 and the DVD deck 43 are electrically connected together by a second integrated substrate underside connector 62b and a DVD deck-side connector 43b which are provided on the sides opposed to each other of the substrate 52 and the deck 43.

On the vehicular front side of the first integrated substrate 61, a power IC (electronic component) 61a which generates heat is provided. The power IC 61a is disposed so as to contact the connecting portion 53 of the holding member 50. A connector 61b for a harness connection is connected to a connector 6a of a vehicle-side wire harness 6 on the vehicular front side of the first integrated circuit 61.

A navigation unit-side connector (component-side connector) 60a is provided on the vehicular rear side of the second integrated substrate 62. The connector 60a is connected electrically to the substrate-side connector 20d of the operating circuit substrate 20.

The first and second integrated substrates 61, 62 and the holding member 50 are connected together electrically, and the substrates 61 and 62 are earthed through the holding member 50, whereby voltage variations on the electronic components mounted on the substrates 61 and 62 are suppressed and a stable voltage is applied to the electronic components.

Similarly to the MD and CD decks 41, 42, the DVD deck 43 is provided with a disc inserting slot 43a, a projection 43c, and a deck mounting portion 43e.

A dust-proof case 70 is formed into a box shape. The dust-proof case 70 is secured to the vehicular front side of the holding member 50 using fastening means such as screws. A wire harness aperture 70a is formed in the vehicular front-side surface of the dust-proof case 70, and the connector 6a of the wire harness 6 is inserted into the aperture 70a to be connected to the harness connecting connector 61b of the first integrated substrate 61.

The vehicle-side wire harness 6 disposed inside the instrument panel 100 includes a plurality of electrical wires distributed from a single integrated electrical wire bundle (not shown) of a large number of trunk electrical wires for power supply and transfer of electrical signals to various portions of the vehicle. The supply of electrical power, as well as the input of ignition switch ON-OFF signals and head lamp and small lamp ON-OFF signals are performed to be sent to the center cluster 1 from the integrated electrical wire bundle through the vehicle-side wire harness 6. On the other hand, from the center cluster 1 to the integrated electrical wire bundle, signals for an audio receiving antenna disposed outside the passenger compartment and adapted to expand and contract electrically, and signals for speakers are output. Earth wire is also included in the vehicle-side wire harness 6.

Next, operation of the center cluster 1 constructed as above will be described below.

As described above, the display unit 30, the MD deck 41, the CD deck 42, the second integrated substrate 62 and the operating members 40S, 60S, 80S are electrically connected with each other through the operating circuit substrate 20. Further, the first integrated substrate 61 is electrically connected to the second integrated substrate 62, and the DVD deck 43 is electrically connected to the first integrated substrate 61. Through these connections, electrical power, which is supplied from the vehicle-side wire harness 6 via the second integrated substrate 62, as well as various electrical signals, are transmitted to the display unit 30, the audio unit 40, and the navigation unit 60. In addition, various electrical signals communicate with each other among the electrical devices 30, 40, and 60.

For example, electrical signals between the operating circuit substrate 20 and the CD deck 42 will now be explained concretely. Electrical signals transmitted from the CD deck 42 to the operating circuit substrate 20 are a CD-ON detection signal indicating that a CD has been inserted into the inserting slot 42a of the CD deck 42, a power ON requesting signal calling for the application of power to the CD deck 42, a right-hand aural signal for output from the right-hand speaker, and a left-hand aural signal for output from the left-hand speaker. The electrical devices 30, 40, and 60 operate in accordance with these signals.

From the operating circuit substrate 20 to the CD deck 42, electrical signals (e.g., an operational signal for determining an operating condition of the CD deck 42 in accordance with operation of an operator) produced from the operating switch 40S and the like are transmitted. Also, 5 V power, 8 V power, and power for a backup memory are supplied. Further, earth wires for power supply and for electrical signals are connected to the CD deck 42. Other transmission/reception signals include communication signals (e.g., TAB communication) based on a common protocol. For example, information on CD is transmitted to the display unit 30, allowing the information to be displayed.

A description will be given below about an assembling procedure for the center cluster 1 constructed as above.

First, the holding member 50 with the dust-proof case 70 attached thereto is fixed to the instrument panel-side mounting member 9 from the inside of the passenger compartment.

Next, the first and second integrated substrates 61, 25 62 and the DVD deck 43 are connected together by the connecting member 63 and the connecting portion 43d of the DVD deck 43.

Then, while side surfaces of the MD deck 41, the CD deck 42 and the DVD deck 43 are guided by the guide portions 51 of the holding member 50, the decks 41–43 are inserted into the opening 50b of the holding member 50 from the inside of the passenger compartment. Further, the projections 41b, 42b and 43c are inserted into the insertion holes 52a, 52b and 52c, respectively. At the same time, the mounting portions 41c, 42c and 43e of the decks 41–43 contact the guide portions 51. Thereafter, the mounting portions 41c, 42c and 43e are clamped to the guide portions 51 by the fastening means such as screws, so that the decks 41–43 are held in the holding member 50.

Subsequently, the connector 6a of the vehicle-side wire harness 6 is connected to the connector 61b of the first integrated substrate 61 through a recess 53a formed in frame or connecting portion 53.

Next, the panel cluster 2, which is constructed by mounting the operating circuit substrate 20 and the display unit 30 beforehand to the ornamental panel 10, is attached to the holding member 50 from the inside of the passenger compartment so as to cover the decks 41–43 and the substrates 61 and 62. For this mounting, the ornamental panel mounting lugs 10b of the ornamental panel 10 are engaged with upper and lower end portions of the holding member 50, respectively. The substrate-side connectors 20c and 20d of the operating circuit substrate 20 are connected with the deck-side connector 40a and the navigation-side connector 60a simultaneously with the mounting of the panel cluster 2 to the holding member 50.

A replacing operation of replacing only the CD deck 42 will be explained. First, the panel cluster 2 is pulled out toward the inside of the passenger compartment against the elastic force of the ornamental panel mounting lugs 10b. At this time, the connectors 20c and 20d are removed from the deck-side connector 40a and the navigation-side connector 60a. Then, the fastening means used in the mounting portions 42c of the CD deck 42 are removed and the projection 42b is pulled out from the insertion hole 52b, whereby the CD deck 42 alone is pulled out toward the inside of the passenger compartment from the holding member 50.

According to the assembling structure of the center cluster 1 of the first embodiment, only a desired component (e.g., CD deck 42), among the decks 41–43 and the first and second integrated substrates 61, 62, can be removed from the inside of the passenger compartment in a fastened state of the holding member 50 to the instrument panel-side mounting members 9. Therefore, such heavy object for manual works as the work of removing the whole of the audio unit and the case assembling/disassembling work can be omitted and the work for removing the electrical device components 61, 62 and 41–43 from the center cluster 1 can be made easier.

Besides, since the power IC 61a is disposed to contact the connecting portion 53 of the holding member 50, and the holding member 50 is formed using a material of a high thermal conductivity, the heat generated from the power IC 61a is conducted to the holding member 50, to perform a heat exchange with the surrounding air. Thus, the holding member 50 can have the function of cooling the power IC 61a. Because the holding member 50 thus has the function of cooling the power IC 61a in addition to the function of holding the center cluster 1 in the instrument panel 100, it is not necessary to provide a specific cooling member for the power IC 61a and hence it is possible to simplify the structure.

Because the first and second integrated substrates 61, 62 are inserted into the opening 50b of the holding member 50, the first and second integrated substrate 61, 62 are surrounded with the holding member 50. Moreover, because the holding member 50 is formed of a material (e.g., magnesium alloy) having an electromagnetic shielding property, it is possible to cut off electromagnetic wave noises from the exterior of the substrates 61 and 62 and prevent leakage to the exterior of electromagnetic wave noises generated from the substrates 61 and 62. Thus, the holding member 50 can have an electromagnetic shielding function for the first and second integrated substrates 61, 62. Further, since the substrates 61 and 62 are earthed through the holding member 50, the holding member 50 can also be endowed with an earthing function for the substrates 61 and 62.

Additionally, because the bolt inserting holes 50a is formed in the holding member 50 to be clamped to the instrument panel-side mounting brackets 9, it is not necessary to provide brackets separated from the holding member 50. Therefore, the number of components can be decreased and it is possible to attain a structural simplification and weight reduction of the center cluster 1.

In the above-described first embodiment, the projections 41b, 42b and 43c of the decks 41–43 are inserted into the insertion holes 52a, 52b and 52c of the holding member 50. However, the projections 41b, 42b and 43c may be formed by resin molding to undergo an elastic deformation in a direction perpendicular to their projecting direction, allowing the projections 41b, 42b and 43b to be deformed elastically and be fitted in the insertion holes 52a, 52b and 52c, respectively, and allowing the fastening means 41c, 42c and 43e to be omitted. In this case, projecting portions supporting the decks 41–43 from below may be formed inside the guide portions 51. Accordingly, the decks 41–43 can be mounted to the holding member 50 which is in a fixed state to the instrument panel 100, easily and detachably from the inside of the passenger compartment.

Figure 4:
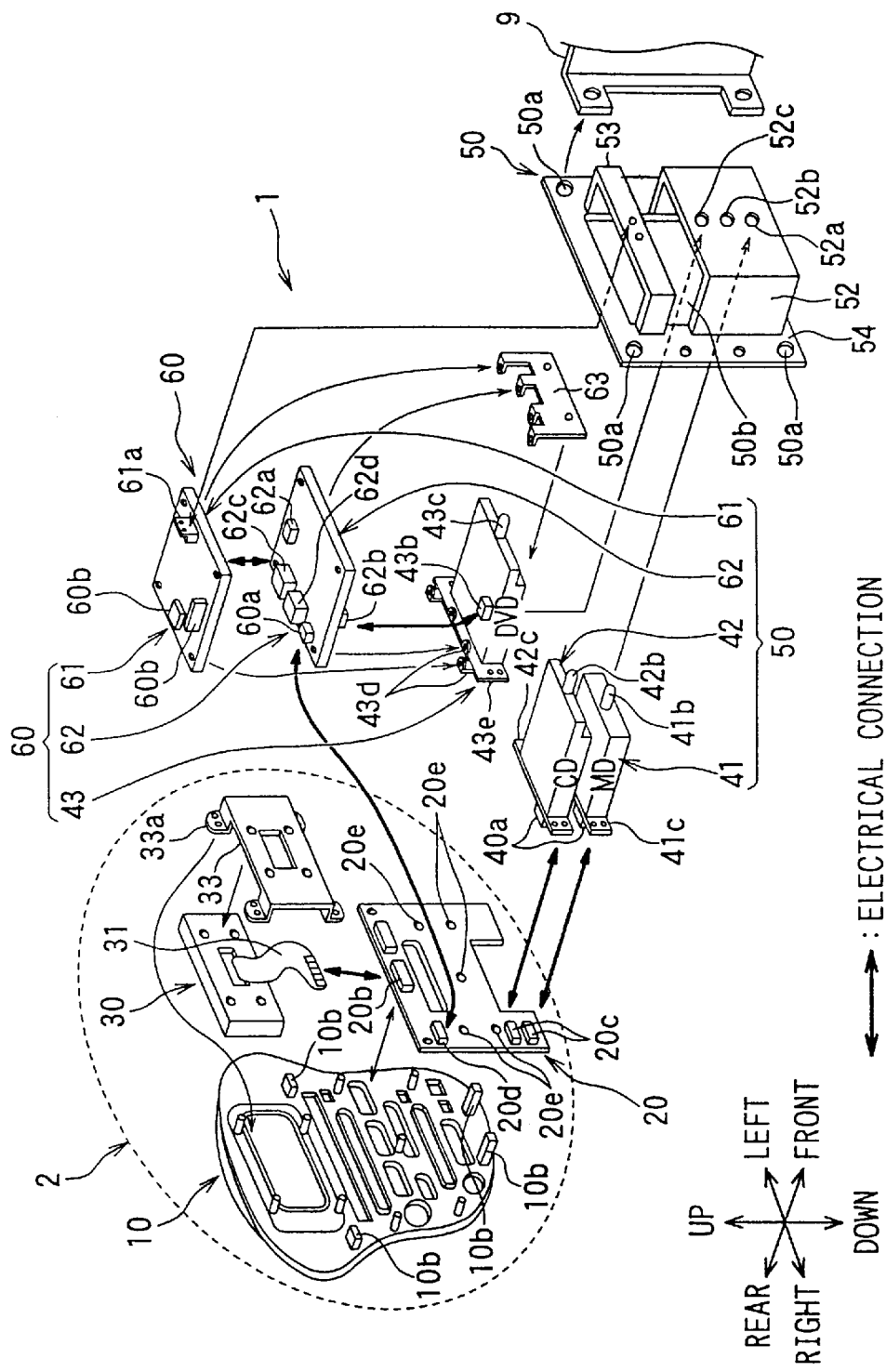
FIG. 4 is an exploded perspective view of a center cluster when being viewed from a vehicle front side, according to a second preferred embodiment of the present invention.
Figure 5:
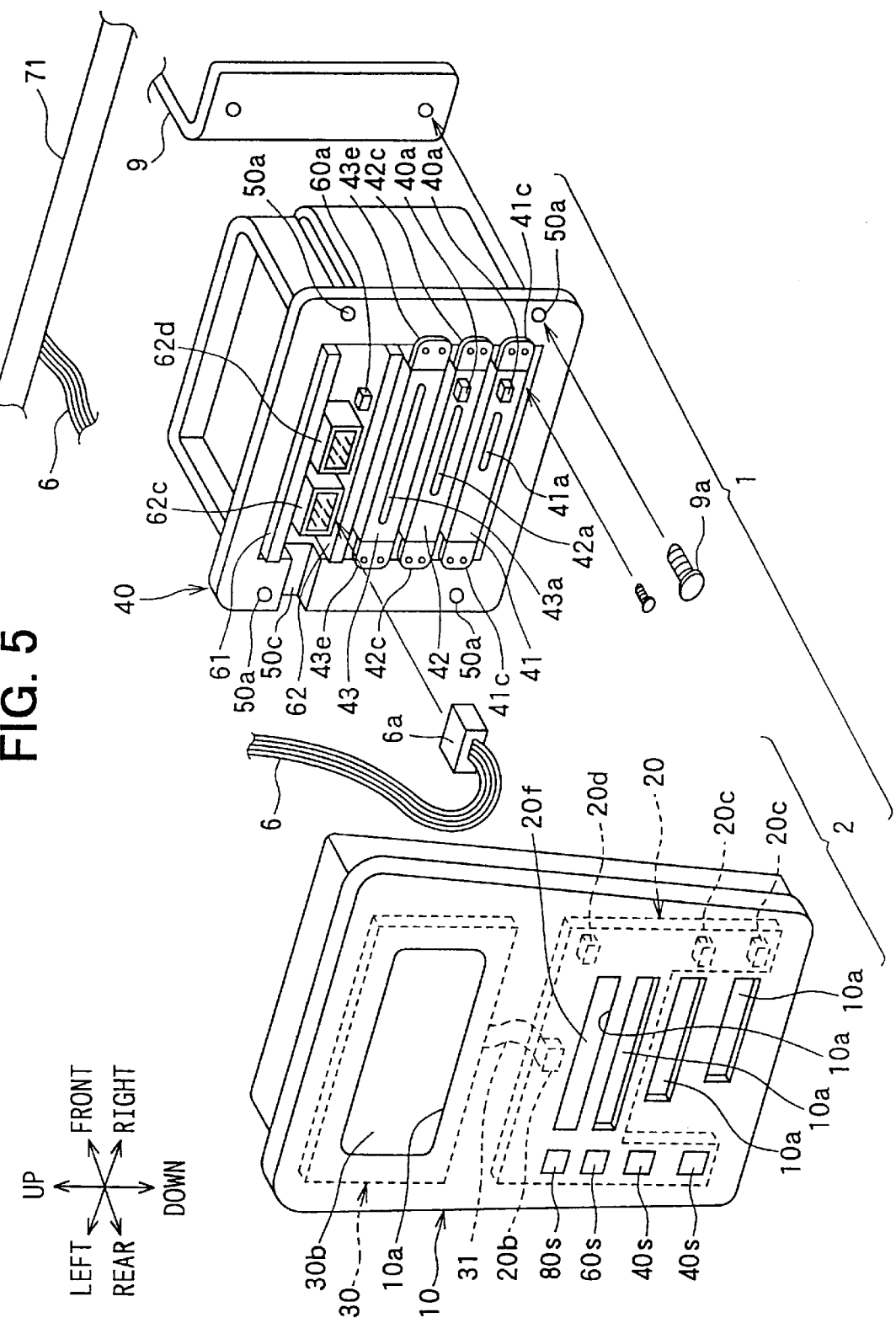
FIG. 5 is an exploded perspective view of the center cluster when being viewed from a vehicle rear side, according to the second embodiment.
Figure 6:
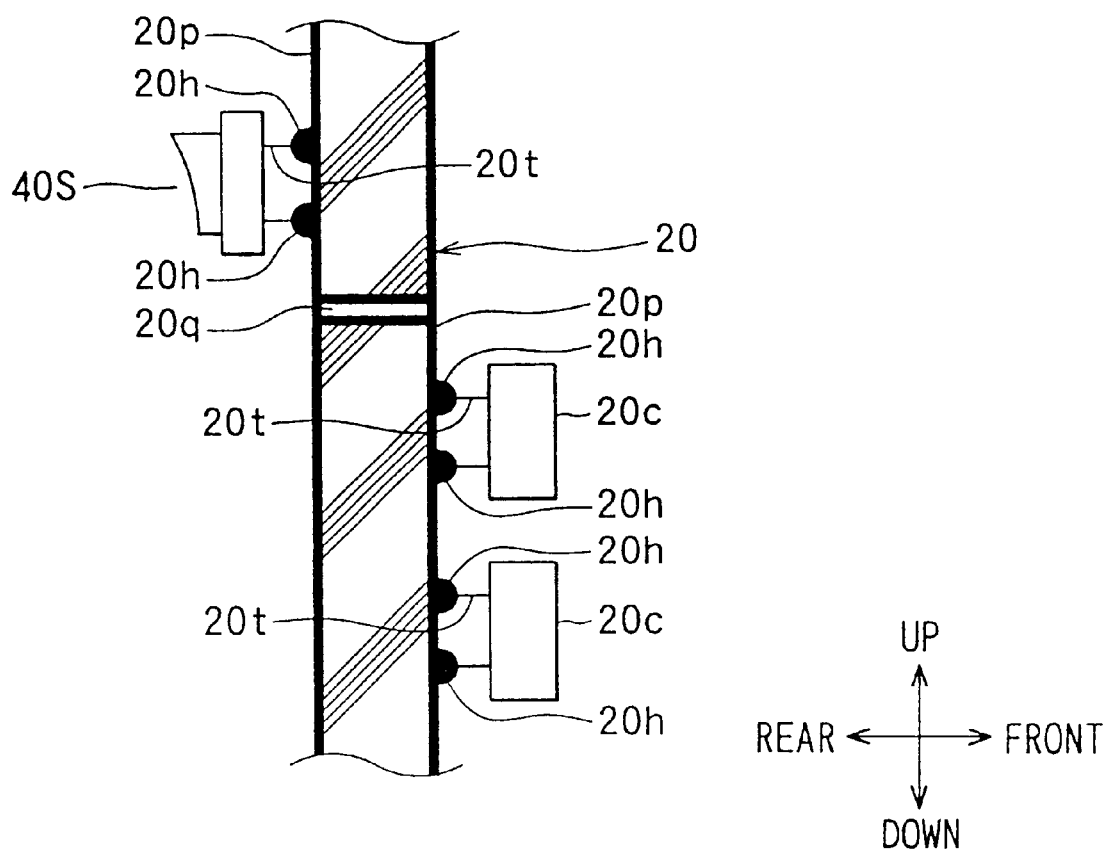
FIG. 6 is a sectional view showing an operating circuit substrate according the second embodiment.

A second preferred embodiment of the present invention will be now described with reference to FIGS. 4–6. In the second embodiment, components similar to those of the above-described first embodiment are indicated by the same reference numbers. In a center cluster 1 of the second embodiment, a plurality of electrical devices, including the display unit 30, the audio unit 40 and the navigation unit 60 are clustered as an integral structure. In the center cluster 1, the ornamental panel 10, the operating circuit substrate 20 and the display unit 30 are assembled as an integral structure and construct a panel cluster 2.

In the second embodiment, the operating circuit substrate 20 is disposed at a vehicle front side of the ornamental panel 10 in parallel with the ornamental panel 10. FIG. 6 shows a sectional surface of the operating circuit substrate 20, perpendicular to the vehicle width direction (vehicle right-left direction). Printed circuits 20p of conductor patterns are provided on both surfaces of the operating circuit substrate 20, and a through hole 20q is provided in the operating circuit substrate 20 for conducting the printed circuits 20p.

On the vehicular rear side of the operating circuit substrate 20, operating members 40S, 60S and 80S such as operating buttons, levers, or switches, which are connected to the printed circuits 20p, are provided. On the vehicular front side of the operating circuit substrate 20, operating circuit substrate-side connectors 20b, 20c and 20d for electrical connection with the electrical devices 20, 40 and 60 are provided. The connectors 20b, 20c and 20d are connected to the printed circuits 20p. Terminal pins 20t of the operating members 40S, 60S, 80S and the connectors 20b, 20c, 20d are soldered to the printed circuits 20p so that connectors 20b, 20c, 20d are electrically connected with each other as shown at 20h. The operating members 40S, 60S and 80S are operated by the driver or a front passenger in the passenger compartment to operate the display unit 30, the audio unit 40 and the navigation unit 60. The operation member for operating the display unit 30 is not indicated directly in the second embodiment.

In the second embodiment, the printed circuit 20p can be formed on only one side surface of the vehicle front and rear surfaces of the operating circuit substrate 20.

Similarly to the first embodiment, the display member 20f (e.g., an electroluminescent display or a liquid crystal display), for displaying an operating condition of an air conditioner, is provided on the vehicular rear side of the operating circuit substrate 20. In the second embodiment, the panel cluster 2, the audio unit 40 and the holding member 50 are similar to those of the above-described first embodiment, and detail explanation thereof is omitted. In the second embodiment, the harness connection position is mainly different from that of the above-described first embodiment.

That is, in the second embodiment, a connector 62c electrically connecting with a wire harness 6 and an option connector 62d are provided on the second integrated substrate 62 at a vehicle rear side. The option connector 62d is for connecting with an electronic device such as a CD changer, s VICS, a backing camera, a VTR adapter, a digital TV. The connectors 62c, 62d are disposed to be detachable from the wire harness 6 or a signal transmitting harness (not shown) with an electronic machine.

The navigation unit-side connector 60a is provided on the vehicular rear side of the second integrated substrate 62. The connector 60a is connected electrically to the substrate-side connector 20d of the operating circuit substrate 20. The first and second integrated substrates 61, 62 and the holding member 50 are connected together electrically, and the substrates 61 and 62 are earthed through the holding member 50.

A single integrated electrical wire bundle 71 of a large number of trunk electrical wires for power supply and transfer of electrical signals to various portions of the vehicle is disposed inside the instrument panel 100. From the single integrated electrical wire bundle 71, plural wire harnesses 6 are branched for the electrical devices 30, 50, 60. The wire harness 6 has the connector 6a to be connected with the connector 62c, 62d provided in the electrical devices 30, 50, 60. The supply of electrical power, as well as the input of ignition switch ON-OFF signals and head lamp and small lamp ON-OFF signals, are performed to the center cluster 1 from the integrated electrical wire bundle 71 through the vehicle-side wire harness 6. On the other hand, from the center cluster 1 to the integrated electrical wire bundle 71, signals for an audio receiving antenna disposed outside the passenger compartment and adapted to expand and contract electrically, and signals for speakers are output. Earth wire is also included in the vehicle-side wire harness 6 and the integrated electrical wire bundle 71.

Next, assembling steps of the center cluster 1 according to the second embodiment will be now described.

First, the first and second integrated substrates 61, 62 and the DVD deck 43 are connected together by the connecting member 63 and the connecting portion 43d of the DVD deck 43.

Then, the MD deck 41, the CD deck 42 and the DVD deck 43 connected to the first and second integrated substrates 61, 62 are inserted into the opening 50b of the holding member 50 from the inside of the passenger compartment. Further, the projections 41b, 42b and 43c are inserted into the insertion holes 52a, 52b and 52c, respectively. At the same time, the mounting portions 41c, 42c and 43e of the decks 41–43 contact a guide portion. Thereafter, the mounting portions 41c, 42c and 43e are clamped to a vehicle rear side surface of the holding member 50 by the fastening means such as screws, so that the decks 41–43 are held in the holding member 50.

Thereafter, the connector 6a of the vehicle-side wire harness 6 is connected to the connector 62c of the second integrated substrate 62. In the second embodiment, a part of the wire harness 6 is disposed in a recess 50c of the holding member 50. Further, a harness connector of the electronic devices is inserted into the option connector 62d to be electrically connected thereto.

Next, the panel cluster 2, which is constructed by mounting the operating circuit substrate 20 and the display unit 30 beforehand to the ornamental panel 10, is attached to the holding member 50 from the inside of the passenger compartment so as to cover the decks 41–43, the substrates 61 and 62, the wire harness 6 and the connectors 6a, 62c. For this mounting operation, the ornamental panel mounting lugs 10b of the ornamental panel 10 are engaged with upper and lower end portions of the holding member 50, respectively. The substrate-side connectors 20c and 20d of the operating circuit substrate 20 are connected with the deck-side connector 40a and the navigation-side connector 60a simultaneously with the mounting of the panel cluster 2 to the holding member 50.

A replacing operation of replacing only the CD deck 42 will be explained. First, the panel cluster 2 is pulled out toward the inside of the passenger compartment against the elastic force of the ornamental panel mounting lugs 10b. At this time, the connectors 20c and 20d are removed from the deck-side connector 40a and the navigation-side connector 60a. Then, the connector 6a of the wire harness 6 is removed from the connector 62c of the second integrated substrate 62. Thereafter, the fastening means used in the mounting portions 42c of the CD deck 42 are removed and the projection 43b is pulled out from the insertion hole 52b, whereby the CD deck 42 alone is pulled out toward the inside of the passenger compartment from the holding member 50.

According to the second embodiment, the integrated substrates 61, 62, the decks 41–43, the wire harness 6 and the connector 6a , 62c are covered by the ornamental panel 10. Therefore, it can prevent the integrated substrates 61, 62, the decks 41–43, the wire harness 6 and the connector 6a , 62c from being exposed to the onside of the passenger compartment.

Further, the ornamental panel 10 is detachably assembled from the passenger compartment, and the connector 62c is provided in the second integrated substrate 62 at a vehicle rear side position. Therefore, even when the integrated substrates 61, 62 and each deck 41, 42, 43 are attached to the holding member 50 before an electrical connection, an operator can readily operate the connector 62c. Therefore, harness connection can be made simple.

Further, when the electrical devices 40, 60 are removed from the instrument panel 100, the operator can operate the connector 62c in the attachment state where the integrated substrates 61, 62 and each deck 41, 42, 43 are attached to the holding member 50.

When the ornamental panel 10 is removed toward the inside of the passenger compartment, the wire harness 6 can be readily detached from the connector 62 toward the inside (rear side) of the passenger compartment. Accordingly, connector connection operation and connector removing operation can be accurately readily performed while being viewed by the operator.

Further, because the wire harness 6 is inserted into the recess 50c of the holding member 50, it can prevent a part of the wire harness 6 between the holding member 50 and the ornamental panel 10 from interfering from each other between the holding member 50 and the ornamental panel 10.

The display unit 30, the MD deck 41, the CD deck 42, the second integrated substrate 62 and the operation members 60S, 60S, 80S are electrically connected through the operating circuit substrate 20. Therefore, electrical wire structure of the center cluster can be made simple. Accordingly, connector connection operation and connector detaching operation can be made simple.

In addition, it is unnecessary to distribute plural wire harnesses 6 between the integrated electrical wire bundle 71 and the center cluster 1. That is, the single wire harness 6 is distributed from the integrated electrical wire bundle 71 so that electrical power is supplied to the electrical devices 30, 40, 60 through the operating circuit substrate 20. As a result, the electrical wire structure can be made simple. Further, in the second embodiment, only by removing the ornamental panel 10, electrical connection of the above-described electronic devices can be readily performed using the option connector 62d.

Figure 7:
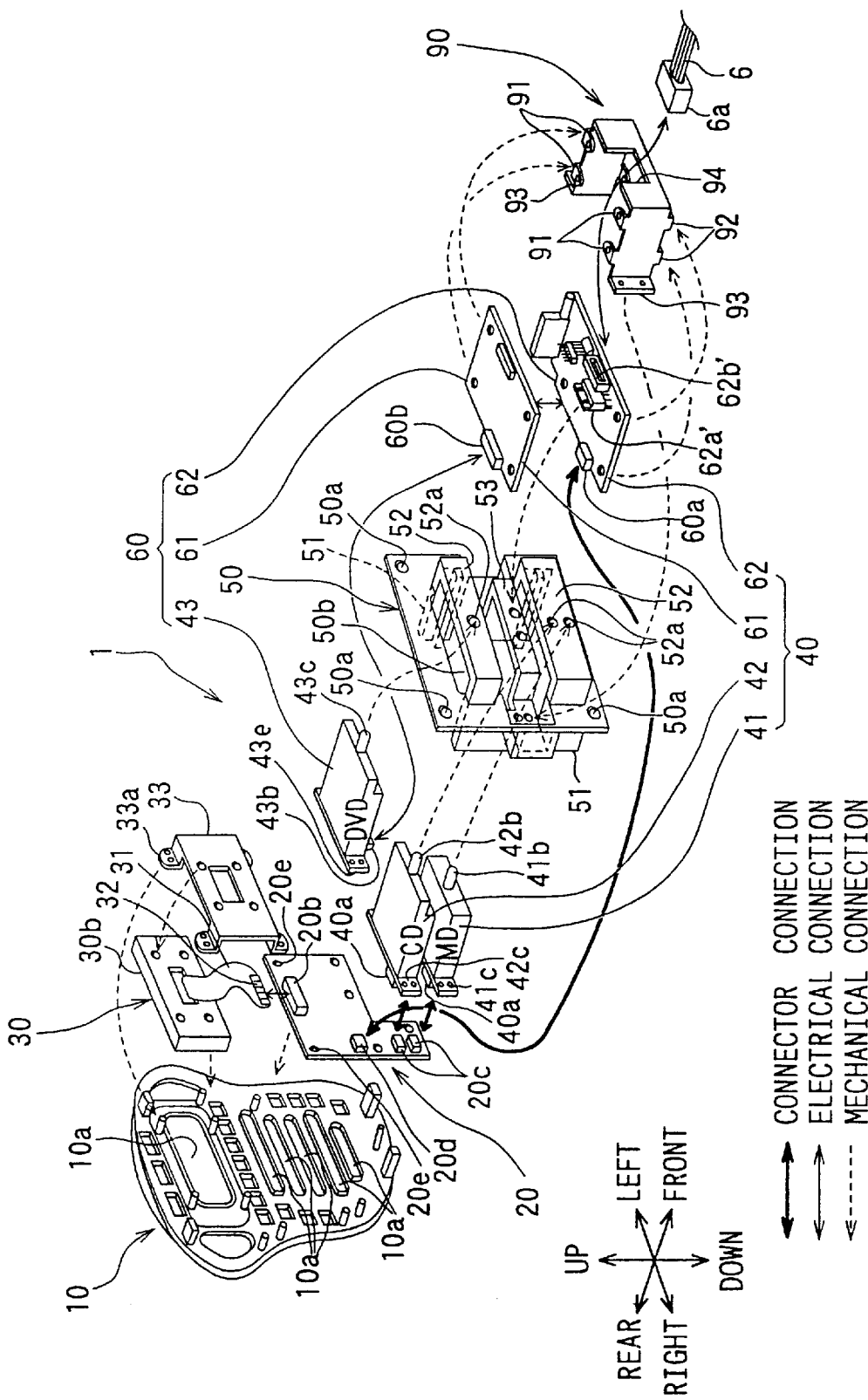
FIG. 7 is an exploded perspective view of a center cluster when being viewed from a vehicle front side, according to a third preferred embodiment of the present invention.
Figure 8:
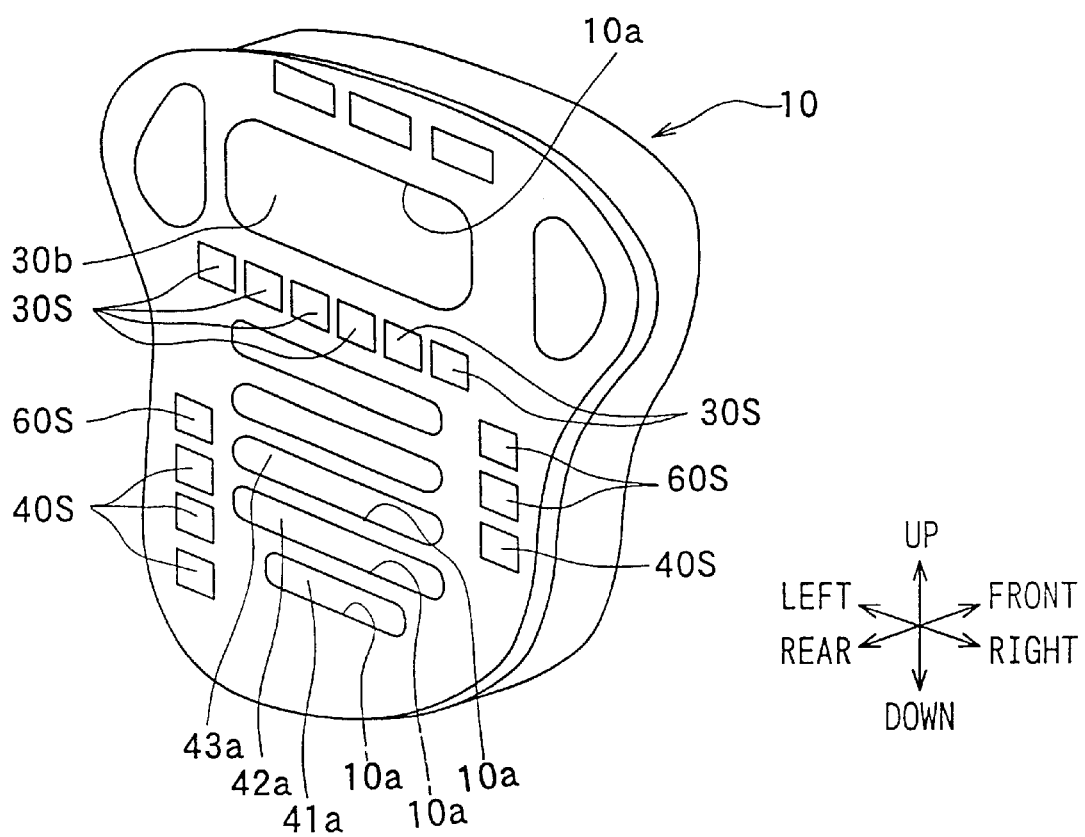
FIG. 8 is a perspective view of the center cluster when being viewed from a vehicle rear side, according to the first embodiment.

A third preferred embodiment of the present invention will be now described with reference to FIGS. 7 and 8. In the third embodiment, the present invention is typically applied to a vehicle center cluster 1. Similarly to the above-described first and second embodiment, in the center cluster 1, a plurality of electrical devices, including a display unit 30, an audio unit 40 and a navigation unit 60 are clustered as an integral structure. The center cluster 1 is disposed centrally in the width direction of an instrument panel 100. FIG. 7 is an exploded perspective view of the center cluster 1 when being viewed from a front side of the vehicle, and FIG. 8 is an exploded perspective of the center cluster 1 when being viewed from a rear side of the vehicle.

Similarly to the first embodiment, the ornamental panel 10 is a resinous panel which covers the electrical devices 30, 40 and 60 from the inside of the passenger compartment (rear side of the vehicle). The ornamental panel 10 is provided with plural apertures 10a for insertion therein of operating members 30S, 40S, 60S for operating the electrical devices 30, 40 and 60 and a liquid display portion 30b of the display unit 30.

The operating circuit substrate 20 is disposed at a vehicular front side of the ornamental panel 10 in parallel with the ornamental panel 10, and is provided with various electronic components (not shown). On both sides of the operating circuit substrate 20, printed circuits of conductor patterns are formed similar to the above-described second embodiment.

On the vehicular rear side of the operating circuit substrate 20, operating members 30S 40S, 60S such as operating buttons, levers, or switches, which are connected to the printed circuits, are provided. The operating members 30S, 40S, 60S are operated by the driver or a front passenger in the passenger compartment to operate the display unit 30, the audio unit 40 and the navigation unit 60. An operation member for operating an air conditioner is not indicated in the third embodiment. The operating member of the air conditioner controls an air-conditioning operation electronically.

On the vehicular front side of the operating circuit substrate 20, operating circuit substrate-side connectors 20b, 20c and 20d for electrical connection with the electrical devices 30, 40 and 60 are provided. The connectors 20b, 20c and 20d are connected to the printed circuits. Terminal pins of the operating members 30S, 40S, 60S and the connectors 20b, 20c, 20d are soldered to the printed circuits of the operating circuit substrate 20 so that connectors 20b, 20c, 20d are electrically connected with each other.

In the third embodiment, the printed circuit can be formed on only one side of the vehicle front and rear surfaces of the operating circuit substrate 20. The terminal pins of the connectors 20b, 20c, 20d may penetrate through the operating circuit substrate 20 to be soldered at the vehicle rear side of the operating circuit substrate 20. Similarly, the soldering of the operation members 30S, 40S, 60S may be performed at the vehicle front side of the operating circuit substrate 20.

The display unit 30 is for displaying various images, e.g., navigation maps and televisional images, to the vehicle driver or other passengers if any. The liquid crystal display portion 30b of the display unit 30 is exposed directly to the interior of the passenger compartment from the associated aperture 10a. The vehicular front side of the display unit 30 is provided with a flexible cable 31 for communication of image data, etc. The flexible cable 31 is provided with a connector 32 which is connected to the connector 20b of the operating circuit substrate 20 to effect intercommunication of image data, and the like, between the display unit 30 and the operating circuit substrate 20.

A display holding member 33 is formed into a plate like, and is disposed on the vehicular front side of the display unit 30. The display holding member 33 is fixed to the display unit 30 using clamping means such as screws. An outer edge of the display holding member 33 is provided with four mounting pieces 33a extending toward the ornamental panel 10. By fastening the mounting pieces 33a to the ornamental panel 10 with clamping means such as tapping screws, the display unit 30 is held in the ornamental panel 10.

The audio unit 40 is disposed on a vehicular front side of the operating circuit substrate 20. The audio unit 40 includes the MD deck 41 for reading an audio signal from an MD (mini disc), the CD deck 42 for reading an audio signal from a CD (compact disc), the first and second integrated substrates 61, 62, and the operating members 40S. The first and second integrated substrates 61, 62 also function to control the navigation unit 60 electronically and further control the electrical devices 30, 40 and 60 synthetically.

The MD deck 41, the CD deck 42, and the first and second integrated substrates 61, 62 are stacked vertically. On the vehicular rear sides of the decks 41 and 42, disc inserting slots 41a and 42a are formed so as to be exposed directly to the interior of the passenger compartment from the associated apertures 10a formed in the ornamental panel 10.

Deck-side connectors (components-side connectors) 40a are provided respectively in the MD deck 41 and the CD deck 42 opposite to the operating circuit substrate 20. The connectors 40a are inserted in the vehicular front-rear direction into the substrate-side connectors 20c of the substrate 20 and are thus connected directly without the use of wiring.

On the vehicular front-side surfaces of the decks 41 and 42 at a center portion in the vehicular right-left direction, projections 41b and 42b projecting to the vehicular front side are formed respectively. On the vehicular rear-side surfaces of the decks 41 and 42, deck mounting portions (fastening means) 41c and 42c projecting in the vehicular right-left direction are formed. The deck mounting portions 41c and 42c come into abutment against the vehicular rear-side surfaces of the guide portion 51 of the holding member 50 to attach the decks 41 and 42 to the holding member 50.

The holding member 50 is disposed on a vehicular front side of the decks 41 and 42. The holding member 50 is formed by a rectangular plate in a shape of a frame having a central rectangular opening 50b. The holding member 50 is made of a light metal having an electric-wave screening performance (e.g., magnesium alloy). The holding member 50 is disposed so that its plate surface is perpendicular to the vehicular front-rear direction. Bolt inserting holes (attachment portions) 50a are formed in the four corners of the holding member 50 to fasten the holding member 50 to a vehicle frame.

In the third embodiment, the rectangular opening 50b is provided in the holding member 50 at a center position. On both side edges in the vehicular width direction (right-left direction) of the opening 50b, guide portions 51 extending toward the vehicular rear side are provided to guide both right and left side surfaces of the decks 41–43. Both stopper portions 52 are formed into U-shapes to extend toward the vehicular front side and to contact vehicular front side parts of the decks 41–43. Further, a connecting portion 53 is formed into a U-shape to extend toward the vehicular front side and to be connected mechanically with the navigation unit 60. In the third embodiment, the connector portions 53 is provided between both the stopper portions 52 in an up-down direction. Centrally in the vehicular width direction of the stopper portions 52, insertion holes (holding member-side fitting portions) 52a into which projections 41b, 42b and 43c of the decks 41–43 are inserted are provided.

While side surfaces of the MD deck 41, the CD deck 42 and the DVD deck 43 are guided by the guide portions 51 of the holding member 50, the decks 41–43 are inserted into the opening 50b of the holding member 50, so that the projections 41b, 42b and 43c are inserted into the insertion holes 52a, respectively. In this case, the decks 41–43 contact the stopper portions 52 so that the decks 41–43 are held in the holding member 50.

The navigation unit 60 includes the first and second integrated substrates 61, 62, a DVD deck 43 for reading signals such as map data signals for navigation from a DVD (digital video disc), and the operating members 60S described above. The second integrated substrate 62, the first integrated substrate 61, and the DVD deck 43 are stacked successively above the CD deck 42 in this order.

In the third embodiment, a connector 43b is provided on a lower surface of the DVD deck 43 at a vehicle front side. The connector 43b of the DVD deck 43 is electrically connected to the second integrated substrate 62. The projection 43c and the mounting portion 43e are provided in the DVD deck 43.

In the third embodiment, a connector 60b is provided on the upper surface of the first integrated substrate 61 at a vehicle rear side position, and is directly connected to the connector 43b of the DVD deck 43 in the vehicle front-rear direction without using a wire. On the other hand, a connector 60a is provided on the second integrated substrate 62 at a vehicle rear side position, and is directly connected to the connector 20 of the operating circuit substrate 20d in the vehicle front-rear direction.

A connector 62b' for connecting with the connector 6a of the wire harness 6 is provided on the second integrated substrate 62. The first and second integrated substrates 61, 62 are provided with connectors opposite with each other, through which the first and second integrated substrates 61, 62 are directly electrically connected.

In the third embodiment, both the first and second integrated substrates 61, 62 are inserted into the opening 50b of the holding member 50 from the vehicle front side at both upper and lower sides of the connection portion 53. A power IC 62a' is provided on the second integrated substrate 62, and a surface of the power IC 62a' facing the holding member 50 contacts the vehicle rear surface of the connection portion 53 of the holding member 50 to be fastened to the connection portion 53 using a fastening member (not shown).

Because the power IC 62a' contacts the holding member 50, heat generated by the power IC 62a' is transmitted to the holding member 50 to be heat-exchanged with air. Accordingly, the holding member 50 cools the power IC 62a'.

The first and second integrated substrates 61, 62 and the holding member 50 are connected together electrically, and the substrates 61 and 62 are earthed through the holding member 50, whereby voltage variations on the electronic components mounted on the substrates 61 and 62 are suppressed and a stable voltage is applied to the electronic components.

In the third embodiment, a substrate holding portion 90 is provided so that the first and second integrated substrates 61, 62 are held in the holding member 50 through the substrate holding portion 90. The substrate holding portion 90 is made of a metal to have an approximate U shape. Four upper attachment pieces 91 and four lower attachment pieces 92 are provided at upper and lower outer peripheral parts of the substrate holding portion 90, respectively. The first integrated substrate 61 is fixed to the upper attachment pieces 91 of the substrate holding portion 90 using a fastening member, and the second integrated substrate 62 is fixed to the lower attachment pieces 92 of the substrate holding portion 90 using a fastening member. In addition, two attachment pieces 93 are provided at both top ends of the U-shaped substrate holding portion 90. The attachment pieces 93 of the substrate holding portion 90 are fixed onto the front surface of the holding member 50. Further, a recess 94 is provided in the substrate holding portion 90 at a position where the connector 62b' of the second integrated substrate 62 is formed.

The vehicle-side wire harness 6 disposed inside the instrument panel 100 includes a plurality of electrical wires distributed from a single integrated electrical wire bundle (not shown) of a large number of trunk electrical wires for power supply and transfer of electrical signals to various portions of the vehicle. The supply of electrical power, as well as the input of ignition switch ON-OFF signals and head lamp and small lamp ON-OFF signals are performed to the center cluster 1 from the integrated electrical wire bundle through the vehicle-side wire harness 6. On the other hand, from the center cluster 1 to the integrated electrical wire bundle, signals for an audio receiving antenna disposed outside the passenger compartment and adapted to expand and contract electrically, and signals for speakers are output. Earth wire is also included in the vehicle-side wire harness 6.

In the assembled center cluster 1 of the third embodiment, for removing the decks 41–43 into the passenger compartment, the following operation is performed.

First, the ornamental panel 10, to which the display unit 30 and the operating circuit substrate 20 are fastened, is pulled out toward the vehicle rear side to be removed inside the passenger compartment. At this time, the MD deck 41, the CD deck 42 and the DVD deck 43 are detached from the connectors 20c, 20d of the operating circuit substrate 20. Then each of the decks 41–43 is pulled out toward the vehicle rear side to be removed into the passenger compartment. At this time, the first integrated substrate 61 is detached from the connector 43b of the DVD deck 43. Accordingly, the decks 41–43 can be respectively removed. The operation of the center cluster 1 is similar to that of the above-described first embodiment, and the explanation thereof is omitted.

According to the third embodiment of the present invention, the MD deck 41, the CD deck 42 and the second integrated substrate 62 are electrically connected through the operating circuit substrate 20 without using a wire harness. Therefore, change operation of the decks 41–43 and maintenance operation of the center cluster 1 can be made easy. Further, assembling operation of the center cluster 1 onto the vehicle can be made easy.

In the third embodiment, only the MD deck 41 and the CD deck 42 of the audio unit 40 may be electrically connected through the operating circuit substrate 20.

Because the holding member 50 has the function of cooling the power IC 62a' in addition to the function of holding the center cluster 1, it is not necessary to provide a specific cooling member for the power IC 62a', and hence it is possible to simplify the structure. Additionally, because the bolt insertion holes 50a are formed in the holding member 50 so that the holding member is fastened to a vehicle frame, it is not necessary to provide brackets separated from the holding member 50.

Although the present invention has been fully described in connection with the preferred embodiments thereof with reference to the accompanying drawings, it is to be noted that various changes and modifications will become apparent to those skilled in the art.

Figure 9:
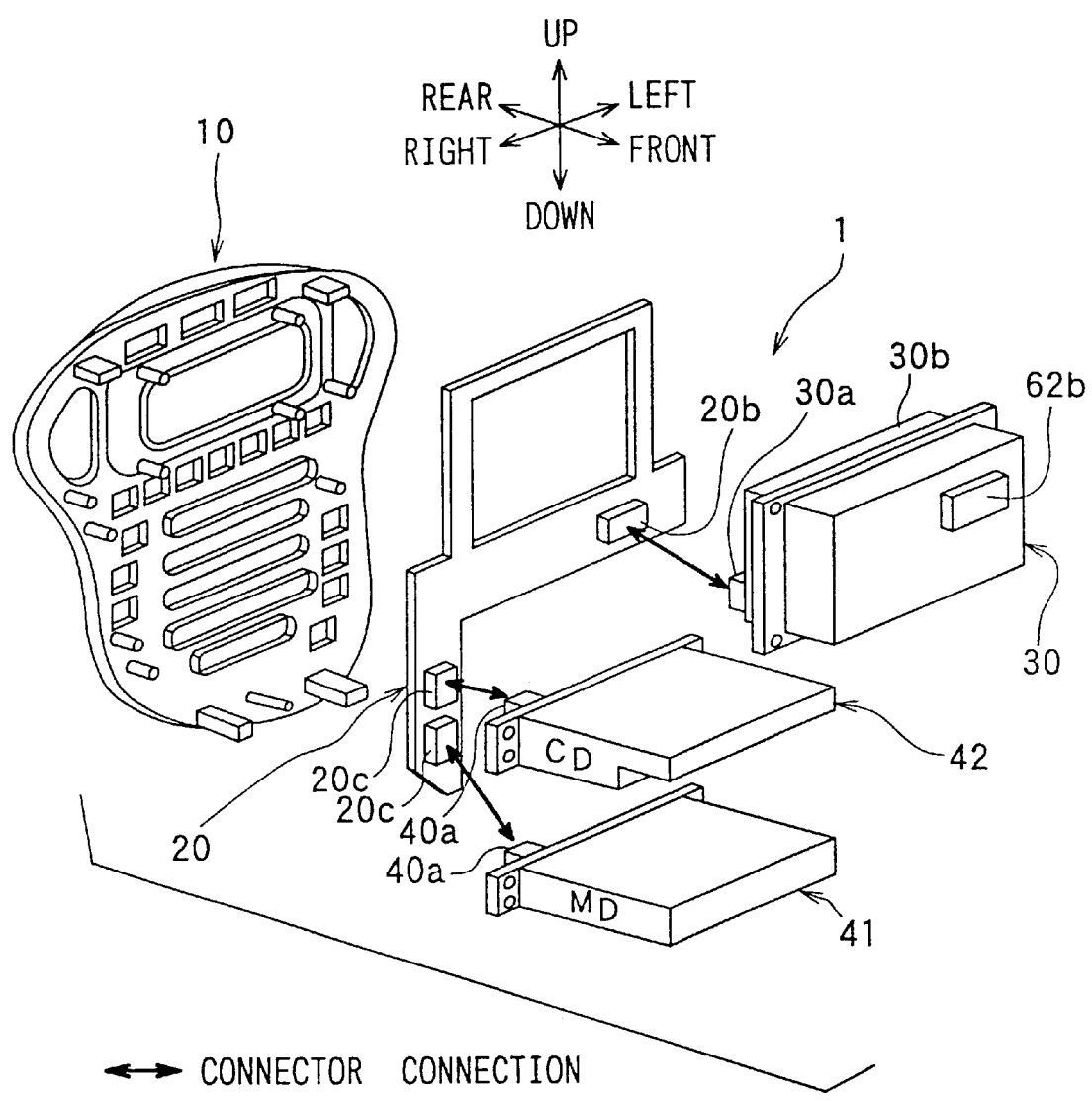
FIG. 9 is an exploded perspective view of a center cluster when being viewed from a vehicle front side, according to a modification of the present invention.

In the above-described embodiments, the display unit 30 is electrically connected to the operating circuit substrate 20 through the flexible cable 31 (i.e., jumper wire). However, as shown in FIG. 9, a connector 30a electrically connecting with the operating circuit substrate 20 can be provided on the rear side surface of the display unit 30, and the connector 30a may be directly inserted into the connector 20b of the operating circuit substrate 20 in the vehicle front-rear direction without using a wire.

Further, in the connectors 40a of the MD deck 41 and the CD deck 42, a communication method, a necessary voltage, a signal sending method, and terminal number may be unified. Similarly, the connectors 20c connected to the connectors 40a of the decks 41, 42 may have the same shapes. Further, the dimensions of the connectors 40a in the vehicle right-left direction may be set to be equal. In this case, by only changing the shape of the opening 10a of the ornamental panel 10, the attachment positions of the MD deck 41 and the CD deck 42 can be changed.

Figure 10B:
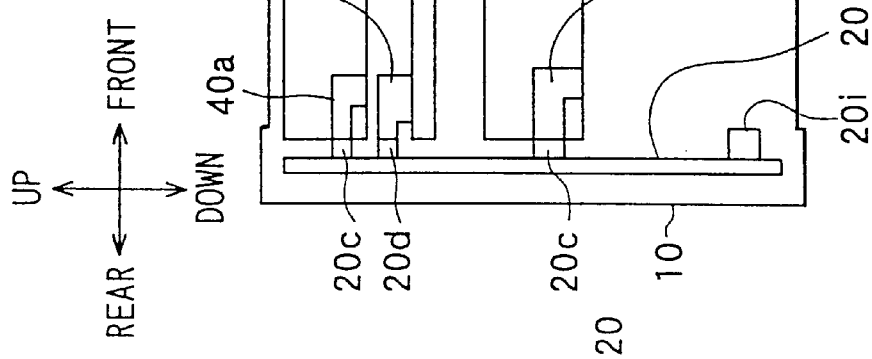
FIG. 10B is a side view of the center cluster when being viewed from a vehicle right side according to the another modification.
Figure 10A:
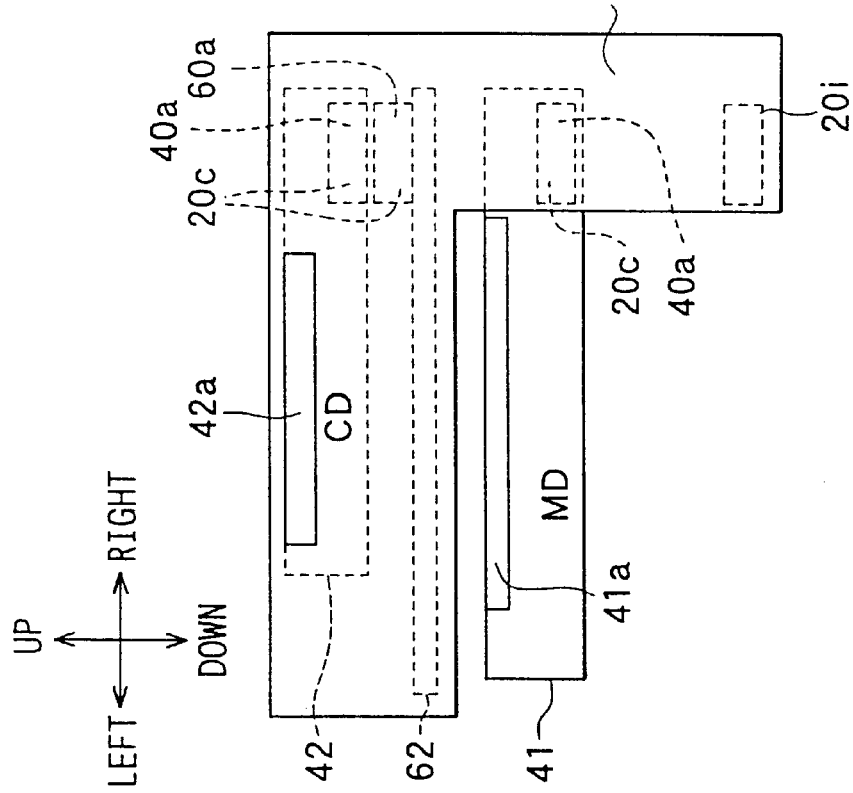
FIG. 10A is a front view of a center cluster when being viewed from a vehicle rear side according to an another modification of the present invention.
Figure 11A:
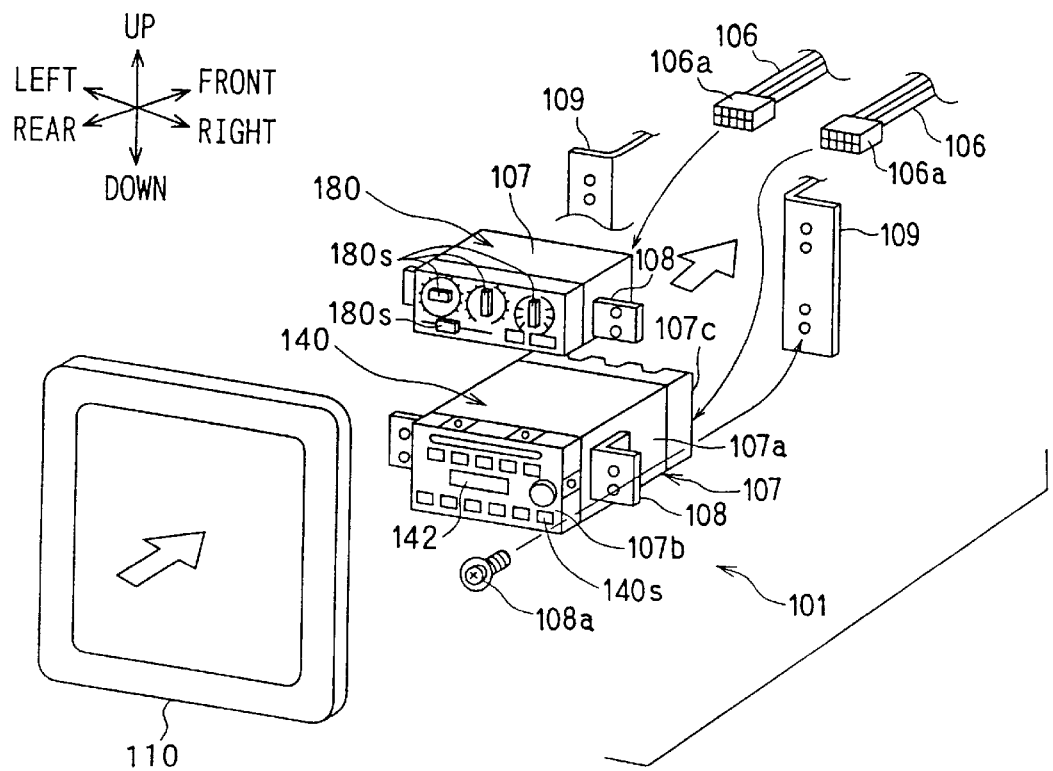
FIG. 11A is an exploded perspective view of a conventional center cluster when being viewed from a vehicle rear side.
Figure 11B:
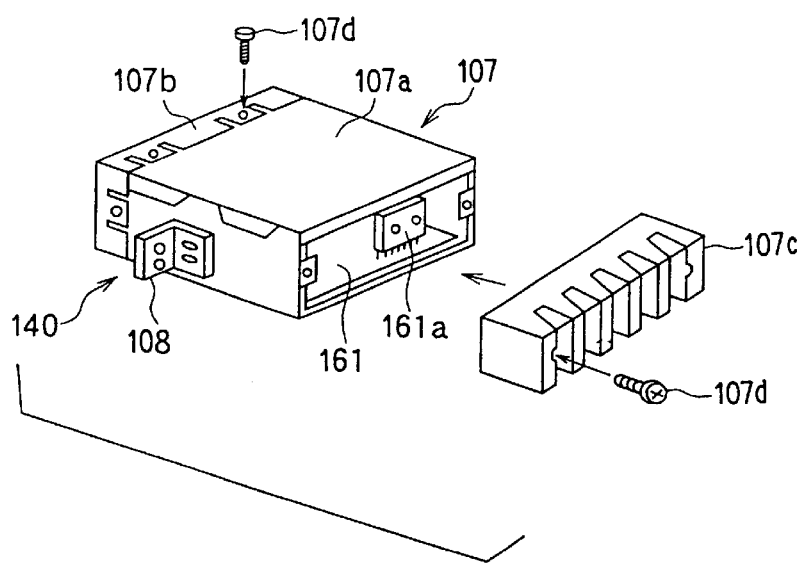
FIG. 11B is an exploded perspective view of the conventional center cluster when being viewed from a vehicle front side.

Further, as shown in FIGS. 10A, 10B, a preliminary connector 20i having a shape equal to the connector 40a may be provided without being connected to the connectors 30a, 40a, 60a. By using the preliminary connector 20i, an additional deck different from the MD deck 41 and the CD deck 42 may be provided.

Such changes and modifications are to be understood as being within the scope of the present invention as defined by the appended claims.

What is claimed is:

1. An assembling structure of a center cluster disposed inside a dashboard of a vehicle at an approximate center portion in a vehicle right-left direction, the assembling structure comprising:

a plurality of electrical devices including at least an electrical deck and an electrical circuit substrate for the electrical deck;

a single operating circuit substrate having an operating member for operating the electrical devics; and a holding member fixed to the dashboard, for holding the electrical devices: wherein:

the electrical devices are assembled to the holding member to be respectively detachable from an inside of a passenger compartment of the vehicle while the holding member is fixed to the dashboard; and the elctrical devices have connectors, respectively, all of which are electrically connected to only the single operating circuit substrate.

2. The assembling structure according to claim 1, wherein the electrical deck and the electrical circuit substrate are disposed to be stacked in a vertical direction.

3. The assembling structure according to claim 1, wherein:

the electrical devices have rear side surfaces toward inside the passenger compartment, in a vehicle front-rear direction; and the rear side surfaces of the electrical devices have fastening members detachably fastened to the holding member.

4. The assembling structure according to claim 1, wherein:

the electrical devices have front side surfaces opposite to the inside of the passenger compartment, in a vehicle front-rear direction;

the front side surfaces of the electrical devices have engagement portions, respectively, being detachably engaged with engagement portions of the holding member; and at least one of the engagement portions of the electrical devices and the engagement portions of the holding member is elastically deformed while being engaged.

5. The assembling structure according to claim 1, wherein the single operating circuit substrate is assembled to be detachable from the inside of the passenger compartment relative to the electrical devices and the holding member, while the electrical devices are held in the holding member.

6. The assembling structure according to claim 5, wherein the single operating circuit substrate has a plurality of connectors directly connecting with the connectors of the electrical devices.

7. The assembling structure according to claim 1, wherein:

the electrical circuit substrate has an electronic member which generates heat;

the electronic member is disposed to contact the holding member; and the holding member is made of a material having a thermal conductivity larger than a predetermined value.

8. The assembling structure according to claim 1, further comprising:

a fitting portion for fitting the holding member to the dashboard, wherein the fitting portion is provided integrally with the holding portion.

9. The assembling structure according to claim 1, further comprising:

a wire harness for supplying electrical power to the electrical devices;

a connection portion, disposed at a vehicle rear side position of one electrical device, through which the wire harness and the one electrical device are electrically connected; and an ornamental panel disposed at a vehicle rear side of the connection portion and the one electrical device, the ornamental panel being assembled to be detachable from the inside of the passenger compartment.

10. The assembling structure according to claim 9, wherein:

the holding member has an opening portion enclosed by a frame portion, into which the electrical devices are disposed;

the frame portion of the holding member has a recess extending from outside the frame portion to inside the frame portion; and a part of the wire harness is disposed in the recess.

11. The assembling structure according to claim 9, wherein:

the single operating circuit substrate is disposed at a vehicle front side of the ornamental panel to be detachably assembled from the inside of the passenger compartment together with the ornamental panel;

all of the electrical devices are electrically connected to the single operating circuit substrate; and the electrical devices are electrically connected from each other through a printed circuit on the single operating circuit substrate.

12. The assembling structure according to claim 1, wherein:

all of the electrical devices are electrically connected to the single operating circuit substrate; and the electrical devices are electrically connected from each other through a printed circuit on the single operating circuit substrate.

13. The assembling structure according to claim 12, wherein:

the single operating circuit substrate has a plurality of connectors, on a surface opposite to the operating member, being electrically connected to all of the electrical devices; and the electrical devices have connectors directly connecting with the connectors of the single operating circuit substrate.

14. The assembling structure according to claim 13, wherein:

the electrical devices include a plurality of decks; and the decks have the same shaped connectors.

15. The assembling structure according to claim 14, wherein:

the operating circuit substrate has a preliminary connector for an additional electrical unit; and the preliminary connector has a shape equal to the same shaped connectors.

16. An electrical connection structure of a vehicle, comprising:

a plurality of electrical devices including at least an audio unit and an electrical circuit substrate for the audio unit, the electrical devices being disposed inside a vehicle dashboard;

a single operating circuit substrate having an operating member for operating the electrical devices;

a wire harness for supplying electrical power to the electrical devices;

a connection portion, disposed at a vehicle rear side position of one electrical device, through which the wire harness and the one electrical device are electrically connected; and an ornamental panel disposed at a vehicle rear side of the connection portion and the electrical devices, the ornamental panel being assembled to be detachable from the inside of the passenger compartment;

wherein the electrical devices have connectors, respectively, all of which are electrically connected to only the single operating circuit substrate.

17. The electrical connection structure according to claim 16, further comprising:

a holding member has an opening portion enclosed by a frame portion, into which the electrical devices are disposed, wherein:

the frame portion of the holding member has a recess extending from outside the frame portion to inside the frame portion; and a part of the wire harness is disposed in the recess.

18. The electrical connection structure according to claim 16, wherein:

the electrical devices are integrally clustered to form a center cluster; and the center cluster is disposed in the vehicle dashboard at an approximate center in a vehicle width direction.

19. The electrical connection structure according to claim 16, wherein:

the single operating circuit substrate is disposed at a vehicle front side of an ornamental panel to be detachably assembled from the inside of the passenger compartment together with the ornamental panel;

all of the electrical devices are electrically connected to the single operating circuit substrate; and the electrical devices are electrically connected from each other through a printed circuit on the single operating circuit substrate.

20. The electrical connection structure according to claim 16, further comprising:

an option connector for electrically connecting an additional electronic unit, wherein the option connector is disposed to be appeared when the ornamental panel is removed.

21. An electrical connection structure of a vehicle center cluster in which a plurality of electrical devices are integrally clustered, the center cluster being disposed inside a vehicle dashboard, the electrical connection structure comprising:

a single operating circuit substrate having an operating member for operating the electrical devices, the operating member being provided at a vehicle rear side of the electrical devices to operate the electrical devices from the inside of the passenger compartment, all of the electrical devices are electrically connected to only the single operating circuit substrate; and the electrical devices are electrically connected with each other through a printed circuit on the single operating circuit substrate.

22. The electrical connection structure according to claim 21, wherein:

the single operating circuit substrate has a plurality of connectors, on a surface opposite to the operating member, being electrically connected to the electrical devices; and the electrical devices have connectors being directly connected to the connectors of the single operating circuit substrate.

23. The electrical connection structure according to claim 22, wherein:

the electrical devices have a plurality of decks; and the decks have the same shaped connectors.

24. The electrical connection structure according to claim 23, wherein:

the single operating circuit substrate has a preliminary connector for an additional electrical unit; and the preliminary connector has a shape equal to the same shaped connectors.

* * * * *